March 17, 1959    R. H. JORDAN ET AL    2,877,797
SINGLE LEVER FAUCET WITH SLIDING VALVE MEMBER
Filed Oct. 13, 1954    2 Sheets-Sheet 1

INVENTOR.
RICHARD H. JORDAN
ROY ANDREWS
BY
Hyde, Meyer, Baldwin & Doran
ATTORNEYS March 17, 1959 R. H. JORDAN ET AL 2,877,797
SINGLE LEVER FAUCET WITH SLIDING VALVE MEMBER
Filed Oct. 13, 1954 2 Sheets-Sheet 2

INVENTOR.
RICHARD H. JORDAN
ROY ANDREWS
BY
ATTORNEYS

United States Patent Office 2,877,797
Patented Mar. 17, 1959

2,877,797

SINGLE LEVER FAUCET WITH SLIDING VALVE MEMBER

Richard H. Jordan and Roy Andrews, Mansfield, Ohio, assignors to Barnes Manufacturing Co., Mansfield, Ohio, a corporation of Ohio Application October 13, 1954, Serial No. 461,978

5 Claims. (Cl. 137—625.40)

This invention relates generally to valves and more particularly to single lever mixing valves for mixing a plurality of varied temperatured fluids in any desired proportion.

An object of this invention is to provide a single lever mixing valve for fluid in which the proportionate supply of each fluid can be adjusted by moving the lever in one direction and the volume of fluid flow adjusted by moving the same lever in another direction.

Another object of the present invention is to provide a unitary mixing valve for mixing varied temperatured fluids and regulating the rate of flow and discharge temperature of said fluid through actuation of a single lever arm.

A further object of this invention is to provide a single lever mixing valve, wherein the proportions of each fluid can be adjusted by one movement of the lever and the volume of said fluid control by another movement of the lever without varying or affecting the proportioning adjustment.

A further object of this invention is to provide a single lever mixing valve having a control valve comprising a pair of plates having smooth surfaces which mate in sealing engagement with one another, one of said plates in communication with a pair of inlet ports, the other of said plates in communication with a mixing chamber, means associated with said plates for communicating fluid between the inlet port and the mixing chamber, wherein one of said plates is movable relative to the other of said plates in a first direction across said other plate to regulate the proportional amount of fluid flowing from each port into said mixing chamber, and movable across said other plate in a second direction to regulate the total volume of fluid flow through said ports into the mixing chamber, this being a valve which is adapted to form a positive seal against fluid overflow or leakage and one that is easy to operate.

Another object of this invention is to provide a mixing valve which, when not performing a mixing function, will not allow any interchange or crossflow of fluid from one valve inlet to another.

Another object of the present invention is to provide a single lever mixing valve characterized by its structural simplicity, the ease of assembly of its parts, its strong and sturdy nature and its low manufacturing cost. Other features of this invention reside in the arrangement and design of the parts for carrying out their appropriate functions.

Other objects and advantages of this invention will be apparent from the accompanying drawings and description and the essential features will be set forth in the appended claims.

Figure 1:
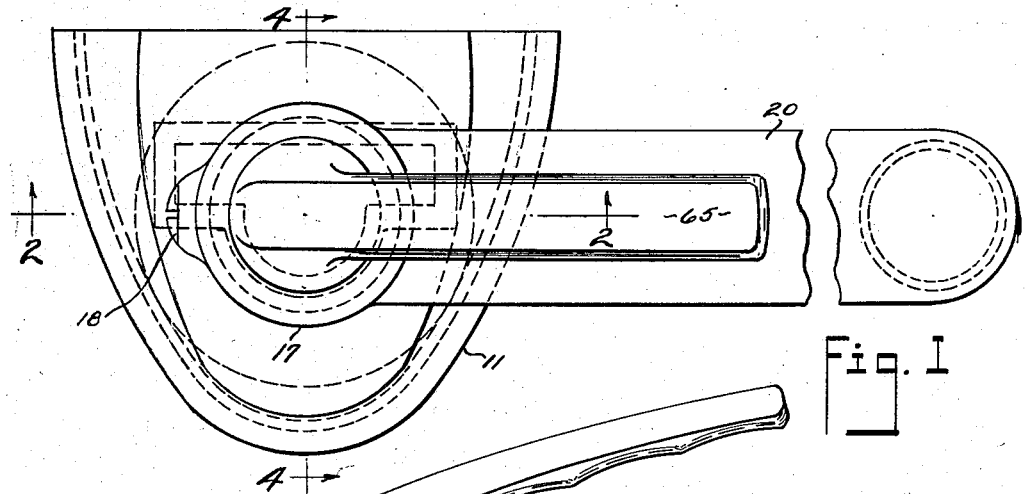
Fig. 1 is a top plan view of a mixing valve, or faucet, embodying the present invention.

Referring now to Figs. 1 through 4 of the drawings, the illustrated valve includes a body 1, in which the component parts of the mixing valve are located. The body consists mainly of a lower valve casing 10 which is encased in an ornamental bracket or housing 11 and retained therein by screws 12 which engage shoulders 13 of the body of valve casing 10. The lower valve casing 10 has a chamber housing 15 threadedly attached to its upper end at 16 and a cap 17 fastened over said chamber housing and secured thereto by means of a bolt 18 which threadedly engages the side of cap 17 and projects inwardly into an annular groove 19 formed adjacent the upper end of chamber housing 15. The groove 19 extends circumferentially around the entire outer periphery of chamber housing 15 and permits the cap 17 to be rotated through a circle of 360°. Cap 17 contains a spout 20 integrally connected therewith and mounted for rotation with the cap member. The spout 20 communicates with the hollow interior of cap 17.

Figure 3:
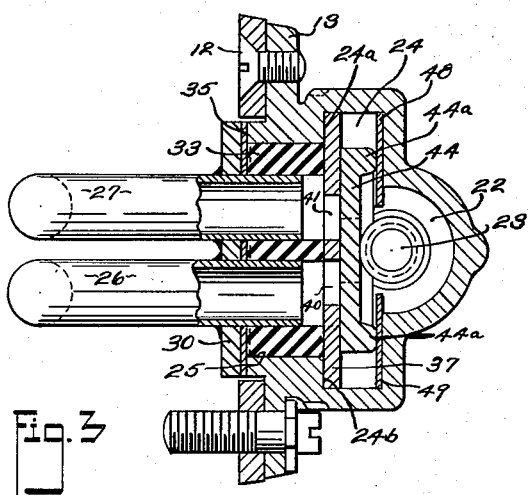
Fig. 3 is a cross sectional view taken along the plane of line 3—3 of Fig. 4.

The lower valve casing 10 contains a hollow semi-circular bore 22, as seen in Fig. 3, which is adapted to receive the lower end of a valve stem 23. An elongated rectangular chamber 24 having a length somewhat greater than the diameter of the semi-circular bore 22 is provided in the lower valve casing 10 adjacent the semi-circular bore 22 and communicates therewith, as seen in Fig. 3. A longer side of chamber 24 is parallel to the diameter of bore 22. A substantially oblong opening 25 extends through the side wall of the lower valve casing 10 and communicates with the rectangular chamber 24. The longer dimension of said oblong opening is somewhat less than that of rectangular chamber 24 and its height is also somewhat less than that of the rectangular chamber. The oblong opening is adapted to receive the fluid supply tubes 26 and 27 respectively. The fluid supply tubes 26 and 27 enter the oblong opening 25 through an end plate 30, to which they are rigidly secured by soldering or other suitable means. The end plate 30 is secured to the lower valve casing 10 by bolts 31 and forms a water-tight cover plate at the end of oblong opening 25. The ends of the fluid supply tubes 26 and 27 are seen to extend into the oblong opening 25 in a spaced parallel relationship to each other. A resilient sealing bushing 33 is provided for the inwardly extending ends of the supply tubes 26 and 27 and has a pair of openings or channels, the annular walls of which fit closely about the exterior of the inlet tubes, and an outer peripheral contour which closely conforms to the contour of oblong opening 25. The resilient sealing bushing 33 has a depth which extends from the inner end of rectangular chamber 24 to a spacer plate 35 which is provided adjacent end plate 30 for a purpose hereinafter described. The inner side of rectangular chamber 24 is covered by a stationary plate 37 which has a length substantially equal to that of rectangular chamber 24 and fits into said chamber with its surface adjacent its ends abutting the shoulders 24a and 24b of the walls of rectangular chamber 24. The stationary plate 37 has a height substantially equal to that of rectangular chamber 24 and is provided at its upper and lower ends with a filler and stop plate 39 to assure a snug fit within the valve structure. Stationary plate 37 is provided with a pair of spaced inlet ports 40 and 41 which are positioned adjacent one another at substantially the same level and communicate with the fluid supply tubes 26 and 27 respectively. The member 33 seals these connections to keep hot and cold liquids separate.

Figure 4:
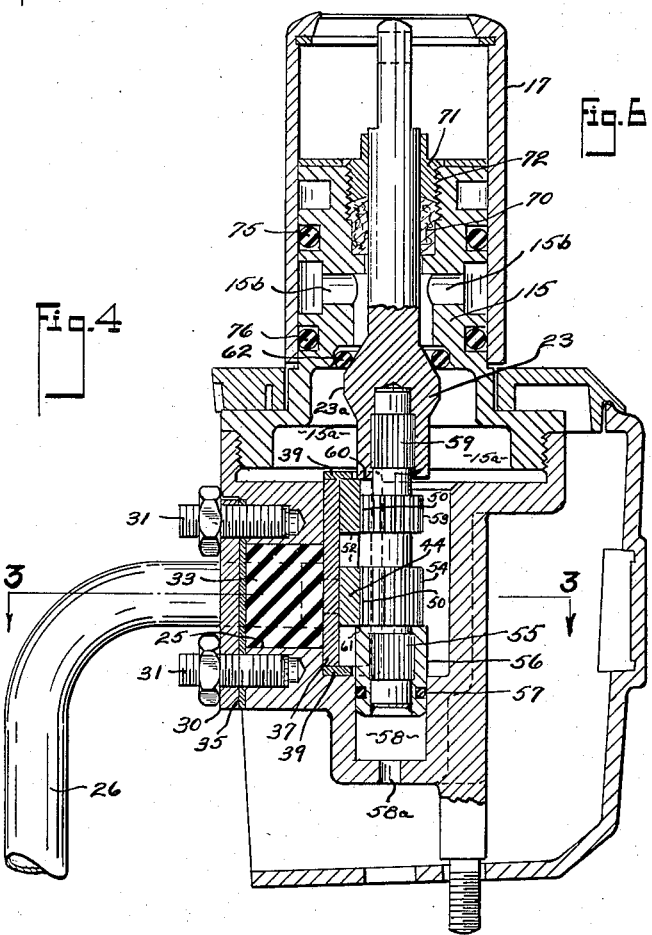
Fig. 4 is a vertical sectional view of the valve assembly taken along the plane of line 4—4 of Fig. 1, with parts broken away to more clearly illustrate the invention.

A control valve member comprises a sliding plate 44 having its surface mating and cooperating in sealing engagement with that of stationary plate 37. The sliding plate 44 has a length substantially less than that of the rectangular chamber 24, as seen in Fig. 3, and a height substantially less than the height of said chamber, as best seen in Fig. 4. The sliding plate has its end portions turned inwardly at 44a so as to extend perpendicular to the plane of the plate, as best seen in Fig. 3. The ends of the turned-in portions abut stationary back-up plates 48 and 49 which are secured to the inner walls of the rectangular chamber 24 opposite the stationary plate 37. Through the use of spacer plates 35 it becomes possible to place the resilient bushing 33 under compression, which causes pressure upon stationary plate 37 pressing it against sliding plate 44, in turn transmitting the pressure against back-up plates 48 and 49 of the rectangular chamber. The bearing surfaces of the various plates and particularly those of stationary plate 37 and sliding plate 44 are machined to a very smooth finish and since they are under constant pressure, there can be no water leakage between adjacent cooperating plates. The sliding plate 44 is provided with a pair of spaced gear rack sections 50 along its upper and lower edges which extend between the inturned end portions 44a. A square aperture or opening 52 is provided between the two geared sections 50 substantially intermediate the length of the slidable plate; the opening has an extent greater than the space between the two ports 40 and 41. The lower end of valve stem 23 has a pair of pinions 53 and 54 axially spaced thereon, and in meshing engagement with the gear sections 50. It will thus be seen that the lower gear pinions on the valve stem 23 and the gear sections 50 of the sliding plate, provide a rack and pinion type mechanical drive for reciprocal movement of the sliding plate 44. The lowermost end of valve stem 23 is provided with a knurled portion 55 to which is secured an enlarged cylindrical end member 56 provided with an O-ring seal 57 snugly engaging a bore 58 provided in the bottom of valve casing 10. The bore 58 provides a support for the end of the valve stem and contains a small hole 58a at its lower end which prevents the formation of vacuum within the valve structure which might render the valve inoperative. The upper end of the pinion-containing portion of the valve stem is also provided with a knurled portion 59 which engages the main or upper valve stem 23 at a zone near the top of the lower valve casing 10, as seen in Fig. 4. The main valve stem 23 has a slightly larger diameter than its lower portion containing the pinions 53 and 54 and provides a shoulder 60 which engages the upper edge of plate 44. The upper end of the cylindrical end member 56 provides shoulder 61 to engage the lower edge of the sliding plate 44. These two abutments cause plate 44 to move vertically up or down with the valve stem 23. The diameter of valve stem 23 increases slightly at a zone 23a above the connection with the knurled portion 59 and contacts in sealing engagement with the inner walls of fluid mixing chamber housing 15 (which is there provided with an O-ring seal 62). Above the enlarged portion 23a the valve stem is elongated to extend upwardly through the interior of the fluid mixing chamber housing 15 and outwardly through an opening in the top of the chamber housing. The upper end of the valve stem is pivotally fastened to a handle 65 by means of a connecting pin 66. Handle 65 has a bifurcated inner end and presents a pair of laterally spaced arms 67 which pivotally and eccentrically engage one end of a link 68 through pin 69. The other end of link 68 is rotatably supported on the upper surface of the chamber housing 15, interiorly and beneath cap 17. In this manner, the link member 68 provides a fulcrum for the pivotal movement of handle 65. A waterproof packing 70 between the stem and the upper outlet of the chamber housing 15 prevents leakage. A packing nut 71 threadedly engages mixing housing 15 at 72 and keeps the packing 70 in place during operation of the valve.

Figure 6:
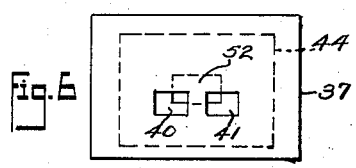
Figs. 6 through 9 are plane developments showing the manner of cooperation between the valve openings and inlet ports used to regulate the proportional amount of fluid flowing from each port into the mixing chamber and also regulating the total volume of fluid flow through said ports into the mixing chamber.
Figure 7:
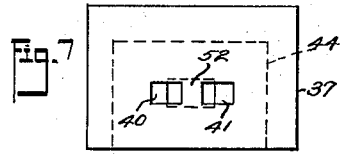
Figure 8:
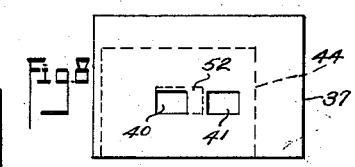
Figure 9:
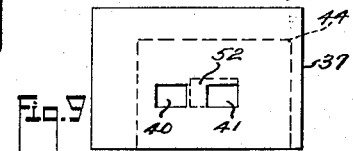

The proportionate amount of fluid flowing from each inlet port 40 and 41 is controlled by horizontal rotation of the handle 65 which causes the valve stem 23 to rotate, in turn rotating the pinion gears 53 and 54 which cause back and forth reciprocal movement of the sliding plate 44. The opening 52 in the sliding plate 44 is thereby located relative to the inlet ports 40 and 41, as best seen in the plan development of Figs. 6 through 9. As the sliding plate 44 is moved back and forth in a horizontal plane, the opening 52 is moved into a position of alignment with either of the inlet ports 40 or 41, to a point wherein the opening 52 is entirely aligned with one of these ports, while the other inlet port is completely closed off by the imperforate portion of the stationary plate 37 dividing the two inlet ports, as illustrated in Figs. 8 and 9. The movable plate 44 may also be reciprocated to locate the opening 52 which is larger than the space between the two ports 40 and 41, proximate to both of said inlet ports 40 and 41 so that a portion of the opening is aligned with each port in accordance with the proportion or combination or fluid desired, as illustrated in Fig. 7. It will thus be seen that as different temperatured fluids enter through the two inlet ports 40 and 41, it is possible to produce any desired fluid temperature between the two limits, by proportioning the amount of each liquid passing through the inlet ports. The flow of the fluid through the inlet ports is gradually and equally variable since the opening 52 moves into registry with the respective inlet ports in a smooth and gradual manner, first with one and then the other.

Figure 2:
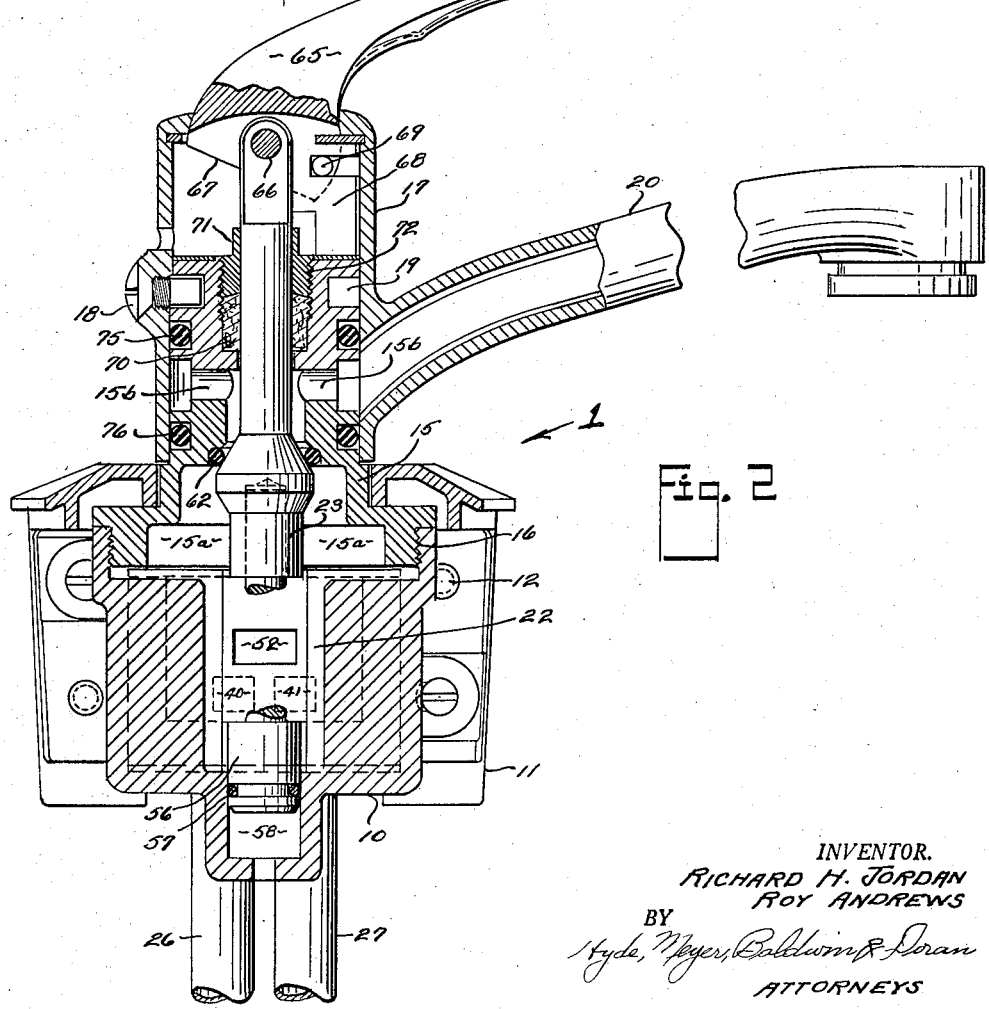
Fig. 2 is a vertical sectional view of the valve assembly structure taken along the plane of line 2—2 of Fig. 1, with additional parts broken away to clearly illustrate the invention.

By moving the handle 65 in a vertical plane, the valve stem 23 is caused to move axially up and down, carrying with it, by means of shoulders 60 and 61, movable plate 44. As the movable plate 44 is lowered, the total exposed area of the inlet ports 40 and 41 is increased to a point of full volume flow. Maximum flow is gained when the handle is raised to its highest vertical position and the sliding plate 44 is in its lowest position with the opening 52 in horizontal alignment with the inlet ports 40 and 41. As viewed in Fig. 6, the opening 52 is only in partial registry with the inlet ports 40 and 41 and therefore, full volume flow is impossible. From a closed position, as illustrated in Figs. 2 and 4, as the control handle 65 is raised, causing slidable plate 44 to be lowered, a greater quantity of fluid will flow as shown in Fig. 6, until it reaches a maximum, as described above and shown in Figs. 7, 8 and 9, whereupon the handle cannot be raised further.

As the fluid enters opening 52 of sliding plate 44 and ports 40 and/or 41 in plate 37, it travels through rectangular chamber 24 upwardly through semi-circular bore 22, through casing 15 into a fluid mixing chamber 15a, through communicating apertures 15b in chamber housing 15 and outwardly by means of discharge spout 20, which is mounted for rotation on cap 17. Sealing rings 75 and 76 are provided between the cap 17 and the mixing chamber housing 15 to permit rotation of the valve spout 20 without leakage.

Thus, when it is desirable to adjust the volume and proportionate flow of the fluid through inlet ports 40 and 41, the handle is merely moved in a horizontal or vertical direction, depending upon the desired results. The total rate of fluid discharge is controlled by vertical movement of the handle which in turn moves the movable plate 44 and opening 52 vertically with respect to the inlet ports 40 and 41. As the movable plate 44 is moved upwardly, the effective area of the inlet ports 40 and 41 is decreased as shown in Fig. 6, thereby permitting a smaller quantity of fluid to flow. Upon rotation of the handle 65, the movable plate 44 is reciprocated back and forth to present the opening 52 more or less in registry with either or both of the inlet ports 40 and 41. The effective area of the inlet ports will increase or decrease proportionally to the area of opening 52 located proximate to the inlet ports 40 and 41. The discharge temperature is thereby regulated by a horizontal rotation of the handle, and the rate of flow is controlled by reciprocal movement of the handle in a vertical plane.

Movement of the valve assembly vertically does not affect the discharge temperature and rotational movement of the assembly does not affect the volume of flow. Independent regulation of the rate of flow and temperature by means of one control handle is thus provided.

Figure 5:
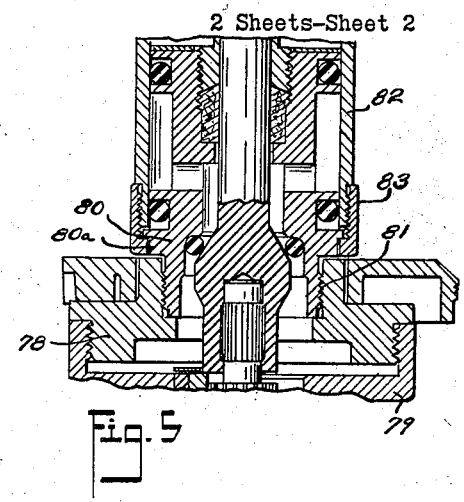
Fig. 5 is a fragmental sectional view of another embodiment of my mixing valve taken in a position corresponding to the upper central portion of Fig. 4.

In Fig. 5 I have shown another modification of my novel valve. Here the internal valve structure is identical to that heretofore described, the difference being only in the fluid mixing chamber housing which was previously constructed of one piece, as seen in Fig. 4 and in Fig. 5 shown as constructed in two parts. In the present embodiment the chamber housing includes a lower portion 78 threadedly secured to the upper portion of the lower valve casing 79 partially shown; and an upper portion 80 threadedly engaging the lower portion 78 at 81. A cap 82 is fastened over the upper portion of the mixing chamber housing 80 by means of a sealing nut 83. The sealing nut 83 threadedly engages cap 82 at its lower end and frictionally engages an annular ridge 80a extending from the upper portion of chamber housing 80. The cap 82 contains a spout (not herein shown), the cap and spout being rotatable through a circle of 360°, through the frictional engagement between the sealing nut 83 and ridge 80a. This particular construction removes the necessity of bolt 18 and groove 19, as means for securely retaining cap 17 to the chamber housing 15, as illustrated in Fig. 2, and further facilitates disassembly of the upper valve housing for purposes of inspection and cleaning.

In view of the foregoing description, taken in conjunction with the accompanying drawings, it is believed that a clear understanding of the construction, operation and advantages of the device will be quite apparent to those skilled in this art.

It is to be understood, however, that even though there is herein shown and described a preferred embodiment of the invention, the same is susceptible to certain changes fully comprehended by the spirit of this invention.

What is claimed is:

1. In a valve device having a casing, means in said casing forming a mixing chamber and a discharge outlet connected in fluid circuit, a pair of spaced inlet ports contained in a resilient seal in communication with said mixing chamber, said seal ending in a predetermined plane, a combined mixture and volume control valve for said inlet ports, said valve arranged between said ports and said mixing chamber and supported by a valve stem, a handle connected to said valve stem and pivoted at one end of said casing, said control valve comprising a sliding plate having its surface mating in sealing engagement with said inlet ports, said sliding plate containing an aperture, a rack on said plate and pinion means on said valve stem for causing to and fro movement of said plate, guide means in said casing for supporting said valve stem in a plane parallel to the plane formed on the end of said seal and in a position so that said rack and pinion are always held in operative condition, said handle being actuatable to rotate said valve stem and cause a progressive movement of said sliding plate and aperture transversely across said inlet ports to vary the exposed area of said aperture relative to each of said ports and provide a predetermined proportion of fluid flow from each of said inlet ports into said mixing chamber, means on said stem operatively connected to said sliding plate and actuatable in response to a vertically pivoted movement of said handle to cause a progressive vertical movement of said sliding plate and aperture across said inlet ports to vary the total exposed area of said aperture relative to said inlet ports and thereby control the total volume of fluid flow past said ports into said mixing chamber.

2. In a valve device having a casing, means in said casing forming a mixing chamber and a discharge outlet connected in fluid circuit, a resilient seal having a pair of horizontally spaced inlet ports in communication with said mixing chamber and ending in a predetermined plane, a steel facing member in said casing supported in said plane, a combined mixture and volume control valve for said inlet ports located between said ports and said mixing chamber and supported by a valve stem, a handle connected to said valve stem and pivoted at one end of said casing, said control valve comprising a sliding plate having its surface mating in sealing engagement with said steel facng member, said sliding plate having a toothed rack and aperture, said valve stem provided with a pinion gear in mesh with said toothed rack, guide means in said casing for supporting said valve stem in parallel spaced relation to the plane formed on the end of said seal and in a position so that said rack and pinion are always held in operative condition, said handle being actuatable to rotate said valve stem and progressively move said sliding plate and aperture horizontally across said inlet ports to vary the exposed area of said aperture relative to each of said ports and provide a predetermined proportion of fluid flow from each of said inlet ports into said mixing chamber, means on said valve stem operatively connected to said sliding plate and actuatable in response to a vertically pivotal movement of said handle to cause a progressive vertical movement of said sliding plate and aperture across said inlet ports and thereby vary the total exposed area of the aperture relative to said inlet ports to control the votal volume of fluid flow past said ports into said mixing chamber.

3. In a valve device having a casing, means in said casing forming a mixing chamber and a discharge outlet connected in fluid circuit, a pair of horizontally spaced inlet ports in communication with said mixing chamber, a combined mixture and volume control valve for said inlet ports arranged between the latter and said mixing chamber and supported in said casing by a valve stem, a handle connected to said valve stem and pivoted at one end of said casing, said casing having a rectangular chamber in fluid circuit with said mixing chamber, said inlet ports entering a flat stationary plate forming one wall of said rectangular chamber, a resilient seal disposed in said rectangular chamber and having its one face ending in a vertical plane and supporting said plate adjacent one side of said mixing chamber, said control valve comprising a sliding plate having its surface mating in sealing engagement with said stationary plate, said sliding plate having a toothed rack and aperture, said valve stem provided with a pinion gear in mesh with said toothed rack, guide means in said casing for supporting said valve stem in a plane parallel to the plane formed by said one face of said seal and in a position such that said rack and pinion are always held in operative condition, said handle being actuatable to rotate said valve stem and move said sliding plate and aperture horizontally transversely across said inlet ports, said sliding plate movement effective to vary the exposed area of said aperture relative to each of said ports and provide a predetermined proportion of fluid flow from said inlet ports into said mixing chamber, means on said valve stem operatively connected to said sliding plate and actuatable in response to a vertically pivoted movement of said handle to cause a vertical movement of said sliding plate and aperture across said inlet ports and axially of said valve stem, such vertical movement of said sliding plate being effective to vary the total exposed area of the aperture relative to said inlet ports and thereby control the total volume of fluid flow past said ports into said mixing chamber.

4. In a valve device having a one piece housing forming a mixing chamber and a discharge outlet connected in fluid circuit, a pair of horizontally spaced inlet ports in said housing, a combined mixture and volume control valve for said ports arranged between the latter and said mixing chamber and supported in said housing by a valve stem, said control valve comprising a pair of plates having smooth surfaces mating in fluid sealing engagement, one of said plates being in communication with said inlet ports and the other of said plates communicating with said mixing chamber, resilient sealing means interposed between said inlet ports and said one plate and supporting the latter in a fixed vertical plane at one end thereof, fluid control means in said plates communicating with said inlet ports and mixing chamber, one of said plates being movable relative to the other of said plates, rack and pinion means operatively connecting said valve stem to said movable plate, means for rotatably actuating said valve stem effective to move said movable plate transversely across said other plate to vary said control means and regulate the proportional amount of fluid flowing from each port into said mixing chamber, guide means in said casing for supporting said valve stem in parallel spaced relation to said vertical plane of said one plate, said guide means supporting said valve stem in a position such that said rack and pinion are always held in operative condition, means operatively connected between said valve stem and said movable plate effective in response to an axial movement of said valve stem to cause a movement of said movable plate across said other plate in a direction axially of said valve stem to vary such control means and regulate the total volume of fluid flow through said ports into said mixing chamber.

5. In a valve device having a casing, a two piece housing mounted in said casing and provided with a mixing chamber and a discharge outlet connected in fluid circuit, a pair of transversely spaced inlet ports in said housing, a combined mixture and volume control valve for said ports comprising a pair of plates having smooth surfaces mating in sealing engagement, one of said plates being in communication with said inlet ports and the other of said plates communicating with said mixing chamber and supported by a valve stem, resilient sealing means interposed between said inlet ports and said one plate and supporting the latter in a fixed vertical plane at one end of said seal, fluid control means associated with said plates for communicating between said inlet ports and mixing chamber, one of said plates being movable relative to the other of said plates, rack and pinion means operatively connected between said valve stem and movable plate, means for rotatably actuating said valve stem effective to move said movable plate in a first direction across said other plate to vary said fluid control means and regulate the proportional amount of fluid flowing from each port into said mixing chamber, guide means in said casing supporting said valve stem in a plane parallel to the vertical plane formed at the end of said seal, said guide means supporting said valve stem in a position such that said rack and pinion are always held in operative condition, means for axially moving said valve stem, means on said valve stem engaging opposed sides of said movable plate and operative in response to said axial movement to actuate said movable plate in a direction transverse to said first direction and vary said fluid control means to regulate the total volume of fluid flow through said ports into said mixing chamber.

References Cited in the file of this patent

UNITED STATES PATENTS

| | | |
|---|---|---|
| 1,126,478 | Joyce | Jan. 26, 1915 |
| 1,459,243 | O'Flaherty | June 19, 1923 |
| 1,559,811 | Trumble | Nov. 3, 1925 |
| 2,503,881 | Manis | Apr. 11, 1950 |